H. BENNETT.
AUTO BED.
APPLICATION FILED FEB. 13, 1918.

1,321,703.

Patented Nov. 11, 1919.
2 SHEETS—SHEET 1.

Witnesses
E. R. Ruppert.

Inventor
H. Bennett

By Victor J. Evans
Attorney

H. BENNETT.
AUTO BED.
APPLICATION FILED FEB. 13, 1918.
1,321,703.
Patented Nov. 11, 1919.
2 SHEETS—SHEET 2.
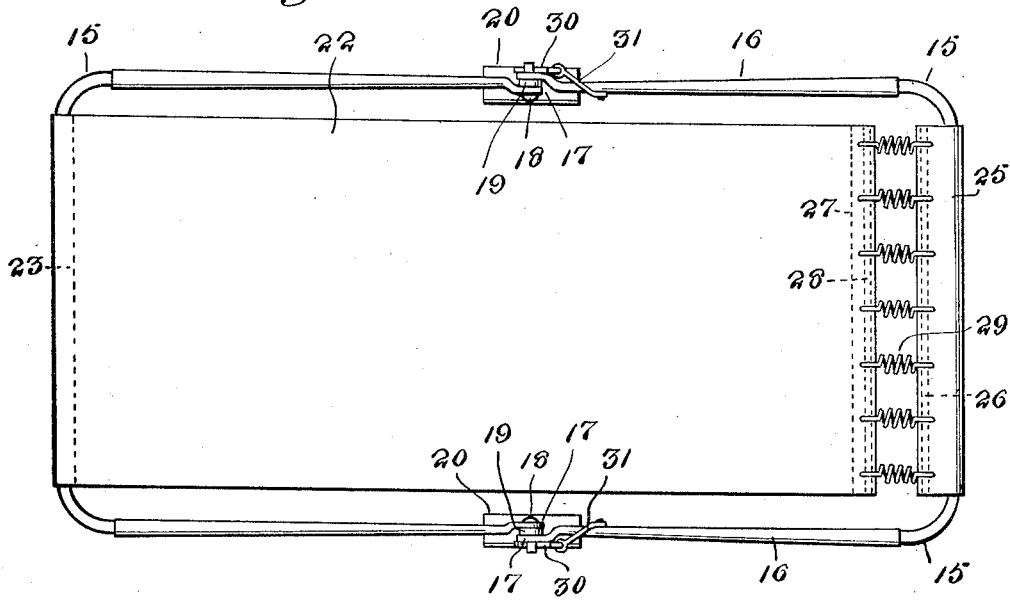
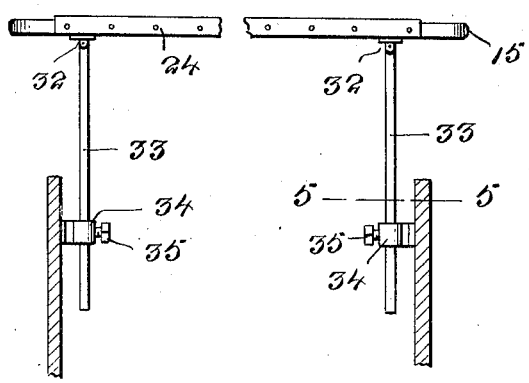
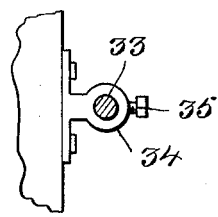
Witness
E. Q. Ruppert.
Inventor
H. Bennett
By Victor J. Evans
Attorney

UNITED STATES PATENT OFFICE.

HERBERT BENNETT, OF LOS ANGELES, CALIFORNIA.

AUTO-BED.

1,321,703.  Specification of Letters Patent.  Patented Nov. 11, 1919.

Application filed February 13, 1918. Serial No. 216,984.

*To all whom it may concern:*

Be it known that I, HERBERT BENNETT, a citizen of the United States, residing at Hollywood, in the city of Los Angeles, in the county of Los Angeles and State of California, have invented new and useful Improvements in Auto-Beds, of which the following is a specification.

This invention relates to a bed attachment for automobiles.

The invention has for its object to produce a simple and effective appliance in the nature of a folding bed structure which may be readily mounted upon and carried by an automobile of conventional construction and which when extended for use will provide a comfortable bed on which the occupant may rest in a recumbent position.

A further object of the invention is to simplify and improve the construction of the bed with a view of carrying it conveniently when traveling over roads.

A further object of the invention is to produce a simple and improved frame structure for the bed, said frame structure being composed mainly of sockets and bows such as are used in the manufacture of conventional automobile tops.

Further objects of the invention are to simplify and improve the construction of the bed and the manner of supporting the same.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings:

Fig. 3 is a plan view of the bed extended and detached from the automobile.

Fig. 4 is a sectional view, enlarged, taken on the line 4—4 in Fig. 1.

Fig. 5 is a sectional detail view taken on the line 5—5 in Fig. 4.

Corresponding parts in the several figures are denoted by like characters of reference.

Figure 6:
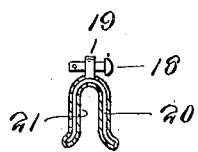
Fig. 6 is a sectional detail view taken on the line 6—6 in Fig. 1.

The frame of the improved bed is composed of a pair of yokes each of which comprises in its construction a bow 15 and two sockets 16, 16, said bow and sockets being preferably of the kind usually employed in the manufacture of automobile tops because such bows and sockets, although by no means standardized, will furnish inexpensive and excellent material for the construction of the yokes, said yokes being formed simply by mounting the end portions of the bows in the respective sockets. The sockets, as is well known, are provided with terminal eyes 17. The eyes 17 of the sockets 16 are engaged with bolts 18, said bolts engaging eyes 19 formed on shoes 20 of inverted U-shaped form, said shoes being adapted to be mounted on the top edges of an automobile body, the latter being generally designated by B. The shoes 20 are preferably lined with soft leather or other material, as best seen at 21 in Fig. 6, to avoid marring the automobile body.

The bed bottom 22 may be constructed of any kind of flexible textile material such as heavy canvas duck, the same being preferably reinforced to avoid undue stretching. The material as well as the detailed construction of the bed bottom may, however, be widely varied within the scope of the invention.

The bed bottom is provided at one end with a hem 23 providing a tubular portion that engages the bridge portion of the bow 15 at the head end of the bed. This construction has been shown in Fig. 3. In Fig. 4, the bed bottom has simply been attached to the bow 15 by tacks 24, it being understood that either of these or any other convenient well known kind may be resorted to for connecting the head portion of the bed bottom with the bow 15. Mounted on the bow 15 at the foot end of the bed frame is a tubular sleeve 25 of textile material in which a stiff metallic rod 26 is supported. The bed bottom 22 is provided at the foot end thereof with a hem 27 forming a tubular portion in which a stiffening rod 28 is supported. The rods 26 and 28 are connected together by means of stout helical springs 29 of sufficient strength to support any weight that may be imposed on the bed bottom and at the same time provide the desired degree of resiliency.

The bolts 18 by which the sockets 16 are pivotally connected with the eyes 19 of the shoes 20 are apertured for the passage of pins or cotters 30 which, in order to prevent loss thereof, may be connected by a string or strap 31 with one of the sockets 16 at each side of the bed frame.

The bow 15 at the head end of the bed is provided with ears 32 with which supporting rods 33 are hingedly connected in such a fashion as to be folded upon the bridge portion of the bow. The rods 33 extend downwardly through sleeves 34 that are securely mounted on the inner face of the car body or of the doors thereof, said rods being securely but adjustably held with respect to the sleeves by means of set screws 35 or equivalent fastening means that will enable the rods to be disconnected from the sleeves when desired.

Figure 1:
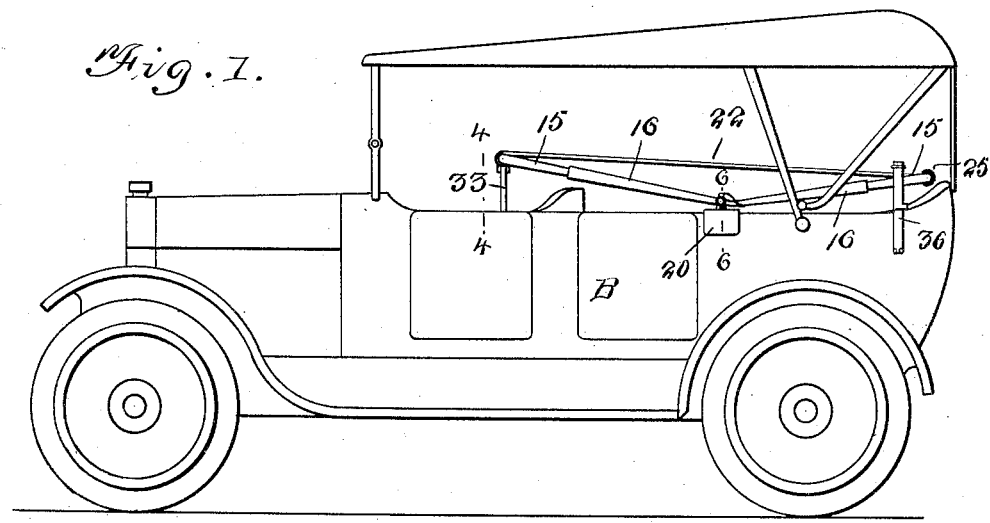
Figure 1 is a side view of an automobile equipped with the improved bed, the bed being shown extended and ready for use.
Figure 2:
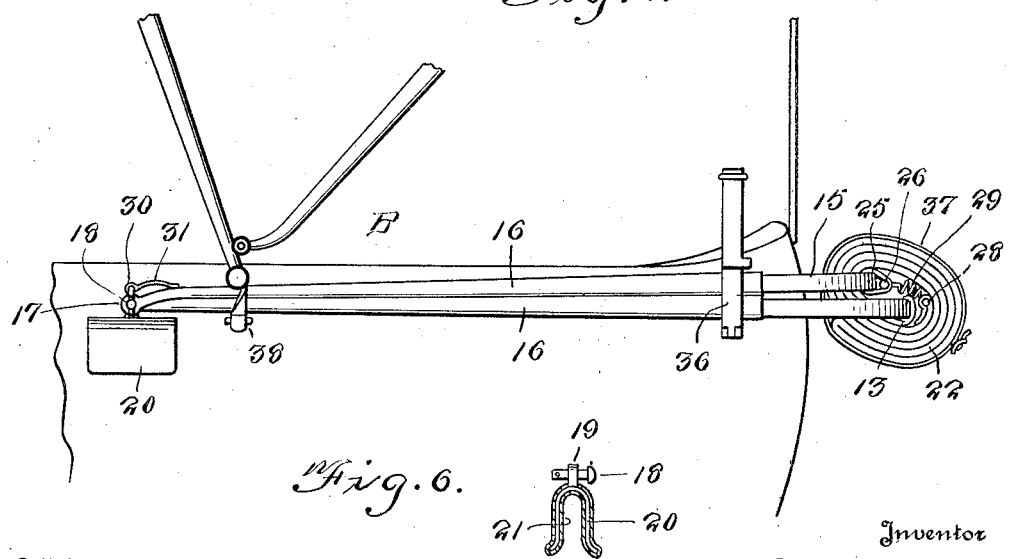
Fig. 2 is a view in side elevation showing the rear part of an automobile on which the bed is supported in folded condition for traveling.

When the bed is extended for use, the shoes 20 are supported on the upper edges of the sides of the car body. The rods 33 are engaged with the sleeves 34, said rods being adjusted so as to bring the head portion of the bed to the desired elevation. The sockets 16 of the foot portion of the bed are engaged with and held securely by top supports 36 which are of conventional construction. The bed will thus be held securely in position for use. When the bed is to be arranged for transportation the frame structure is folded about the axes of the bolts, and the shoes 20 are removed from the sides of the automobile. The bed may now be compactly rolled about the bows 15 of the respective yokes, as seen in Fig. 2, the rods 33 having been previously disconnected from the sleeves 34 and folded on the bridge portion of the bow at the head end of the bed, and secured by means of a strap 37 or other suitable and well known means. The folded bed will now be supported on the brackets of the front and rear top supports 38 and 36, as best seen in Fig. 2, it being obvious that any well known means may be utilized to secure the bed against displacement or loss.

It will be very evident that peculiarities in the construction of various makes of automobiles will make it necessary to depart slightly at times from the special construction herein shown and described and it will be likewise evident that it is not intended in the appended claims to embody any limitations that will preclude the adaptation of the invention to all the different forms and makes of automobiles in general use at the present time.

I claim:

1. An automobile bed comprising a pair of U-shaped yoke members, a pair of shoes of U-shape and adapted to engage the edges of the sides of an automobile, means for pivoting the terminals of the yokes to said shoes and a flexible bed bottom having its ends connected with the bridge pieces of the yokes.

2. An automobile bed comprising a pair of U-shaped yoke members having eyes at their terminals, a pair of U-shaped shoes adapted to engage with the edges of the sides of an automobile, each shoe having an upwardly projecting portion having an eye therein, bolts passing through said eyes and the eyes in the terminals of the yokes for pivotally connecting the parts together and a flexible bed bottom having its ends connected with the bridge pieces of the yokes.

3. An automobile bed comprising a pair of U-shaped yoke members, a pair of shoes adapted to engage with the side edges of an automobile, means for pivoting the terminals of the yoke members to said shoes, a flexible bed bottom having its ends connected with the bridge pieces of the yokes, rods hingedly connected with one of the yoke members, sleeves on the inner faces of the side portions of the automobile through which said rods extend and means for securing the rods in the sleeves at various adjustments.

In testimony whereof I affix my signature.

HERBERT BENNETT.